W. McA. JOHNSON.
DISTILLATION FURNACE.
APPLICATION FILED MAY 8, 1906.
920,473.
Patented May 4, 1909.
Fig. 1.
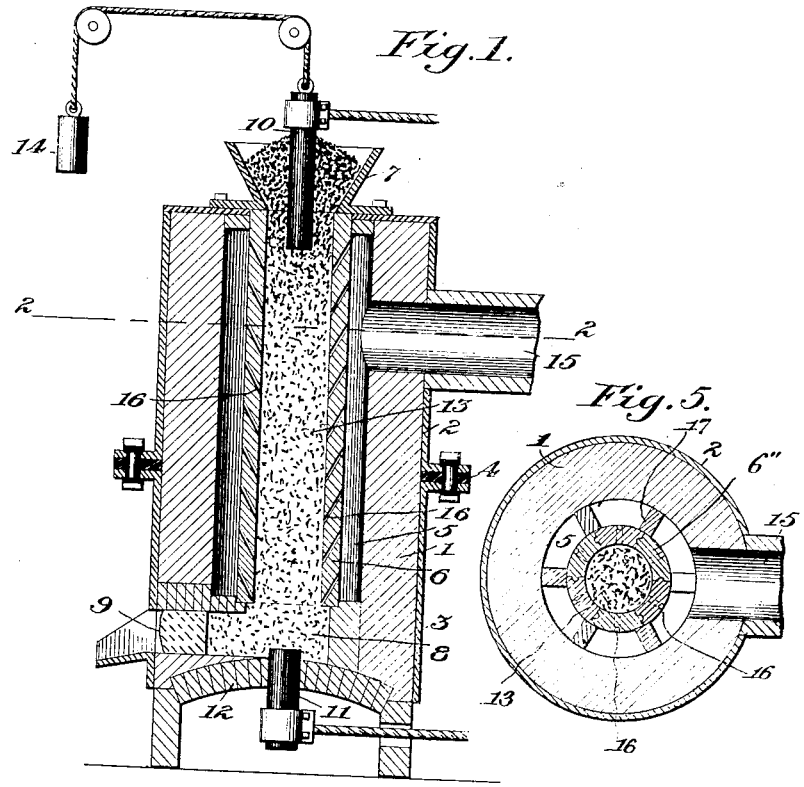
Fig. 5.
Fig. 2.
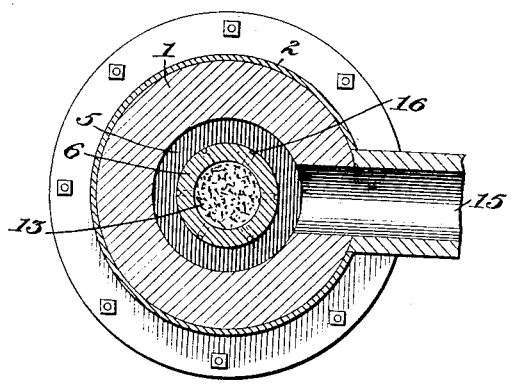
Fig. 3.
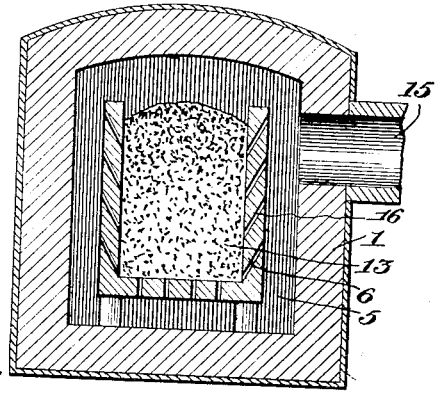
Fig. 4.
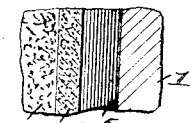
Witnesses:
Geo. E. Gauett
Chas. H. Potter
Inventor:
Woolsey McA. Johnson,
by Byrnes & Townsend,
Att'ys.

UNITED STATES PATENT OFFICE.

WOOLSEY McALPINE JOHNSON, OF HARTFORD, CONNECTICUT, ASSIGNOR TO THE CONTINUOUS ZINC FURNACE COMPANY, OF HARTFORD, CONNECTICUT, A CORPORATION OF CONNECTICUT.

DISTILLATION-FURNACE.

No. 920,473.    Specification of Letters Patent.    Patented May 4, 1909.

Application filed May 8, 1906. Serial No. 315,845.

*To all whom it may concern:*

Be it known that I, WOOLSEY McA. JOHNSON, a citizen of the United States, residing at Hartford, in the county of Hartford and State of Connecticut, have invented certain new and useful Improvements in Distillation-Furnaces, of which the following is a specification.

The object of this invention is to provide a furnace designed particularly for the treatment of large bodies of material yielding volatile products. The construction is such as to provide an intensive heating or reaction zone and to afford a free and easy discharge from all portions of this zone to the condenser or other collecting means. The furnace will be described by reference to the reduction of zinc ore, but is adapted to the treatment of any charge or material yielding a volatile product.

For the further understanding of my invention reference is made to the accompanying drawing showing the application thereof to an electric furnace, wherein:

Figure 1 is a central vertical section of one form of furnace embodying my invention; Fig. 2 is a horizontal section on line 2—2 of Fig. 1; Fig. 3 is a transverse vertical section of a horizontal furnace; Fig. 4 is a fragmentary sectional view illustrating a modified form of permeable casing; and Fig. 5 is a horizontal section of a modification of the furnace shown in Figs. 1 and 2.

The furnace illustrated in Figs. 1 and 2 comprises massive fire-brick walls 1, preferably incased in a metal sheath constructed in two or more sections 2, 3, with interposed insulation 4. The walls 1 inclose a chamber 5 in which is concentrically disposed a permeable tubular casing 6, constituting the reaction chamber of the furnace and constructed of highly refractory non-conductive material. The casing 6 communicates at its upper end with a hopper 7 and at its lower end with a chamber 8 to which access is afforded by the removal of residue by a door 9. Upper and lower electrodes of carbon are disposed in proximity to opposite ends of the casing 6, the upper electrode extending through the charge in the hopper 7, while the lower electrode projects upwardly through the arched bottom 12 of the furnace chamber into contact with the conductive charge 13. The upper electrode may be counterpoised as indicated at 14.

The operation will be readily understood. The charge comprising a suitably conductive mixture of ore and carbon being provided, the electric circuit is closed and a temperature sufficient for the reduction is established between the electrodes. The volatile products, consisting in the present instance of zinc vapor and carbon monoxid are enabled to pass freely from the zone of reduction through the permeable refractory casing 6 into the adjacent chamber 5, and thence by conduit 15 to a suitable condenser or collector.

The casing 6 is permeable to the reaction products. This permeability may be secured in any desired way, as for instance (1) by providing a plurality of apertures or perforations 16 which may be spaced 6–12 inches apart and are preferably upwardly inclined at such angle, say 60°–70°, as will prevent the charge from working outwardly through the casing; (2) by providing a porous casing as indicated at 6' in Fig. 4, a casing of this character being readily prepared by incorporating 10–20 per cent. by volume of charcoal or other combustible or volatile matter with a refractory fire-clay and afterward eliminating the same by firing; or (3) by a combination of the above methods, that is to say by providing an apertured porous casing.

My invention is not restricted to a vertical furnace although it presents greater advantages as applied thereto. Fig. 3 illustrates a horizontal furnace comprising sheathed walls 1, concentrically disposed within which is a permeable, refractory, trough-like casing 6, the sides and bottom of which are perforated or rendered porous to permit the ready escape of volatile products. In this case the electrodes are disposed in contact with the charge at opposite ends of the casing as in Fig. 1. It should be understood that the chamber 5 is not intended to serve as a condenser, being maintained by the highly heated charge above the vaporizing temperature of the volatile product.

My improved construction presents advantages as follows: 1. It provides such ready escape for the volatile products, that these are not forced into the walls of the furnace as has been the case in prior constructions. 2. Current leakage through the furnace walls is largely reduced; for the construction of the chamber 6 such material should be chosen as will not conduct the current to a substantial extent at the temperature employed, while the walls 1, being spaced from the charge by the chamber 5 do not conduct the current therefrom. 3. Heat losses by radiation are reduced by the interposition of the chamber 5 between the highly heated charge and the external walls. 4. The casing 6 is readily replaced or repaired in case of injury. To facilitate repair and to permit construction of large furnaces this casing 6 may be made in two or more properly secured superposed sections; or a large casing may be constructed of several sectors as indicated at 6'', 6'' in Fig. 5, dove-tailed or otherwise joined, and properly supported at the lines of junction as by non-conductive bricks 17 projecting inwardly from the walls. In this case the effect will be to partially or completely subdivide the chamber 5 but without restricting the outlet for the volatile products.

In the specific example given the heat is developed in the body of a granular conductive charge contained in the casing 6 by transmitting the current through such charge. My invention is not restricted to this particular method of heating, but I may utilize a register of any form or character desired, or I may employ heating by indirect or direct action of the heated products of combustion of coal or gas.

I claim:—

1. An electric furnace comprising a furnace chamber having a vapor outlet, a permeable casing of refractory non-conductive material within said furnace chamber and spaced therefrom, electrodes disposed at opposite ends of said casing out of arcing relation, and means for feeding a charge to the interior of said casing.

2. An electric furnace comprising a furnace chamber having a vapor outlet, a casing of refractory non-conductive material within said furnace chamber and spaced from the walls thereof, upwardly inclined perforations traversing the walls of said casing, electrodes disposed at opposite ends of said casing, and means for feeding a charge to the interior of said casing.

3. An electric furnace comprising a furnace chamber having a vapor outlet, a permeable casing of refractory non-conductive material within said furnace chamber and spaced therefrom, said casing consisting of separable sections, electrodes disposed at opposite ends of said casing, and means for feeding a charge to the interior of said casing.

4. An electric distillation furnace comprising a vertical reaction chamber consisting of a permeable casing of refractory non-conductive material, a hopper communicating with the same at its upper end, a discharge door near the lower end of said casing, electrodes at opposite ends of said casing, a chamber surrounding said casing and a vapor outlet for said chamber, substantially as described.

5. An electric distillation furnace comprising a vertical casing of refractory non-conductive material, a plurality of upwardly-inclined apertures extending through said casing, a hopper communicating with the casing at its upper end, a discharge door near the lower end of said casing, electrodes at opposite ends of said casing, a chamber surrounding the casing and a vapor outlet for said chamber, substantially as described.

In testimony whereof, I affix my signature in presence of two witnesses.

WOOLSEY McALPINE JOHNSON.

Witnesses:
CHARLES M. STARKWEATHER,
ROGER H. HOVEY.